United States Patent [19]

Brooks

[11] Patent Number: 5,183,226
[45] Date of Patent: Feb. 2, 1993

[54] UNIVERSAL COLLAPSIBLE BAG SUPPORT STAND

[76] Inventor: Russell G. Brooks, 2321 Country Club Dr., Titusville, Fla. 32780

[21] Appl. No.: 764,243

[22] Filed: Sep. 23, 1991

[51] Int. Cl.⁵ .............................................. A63B 55/04
[52] U.S. Cl. ...................................... 248/97; 403/205; 403/347
[58] Field of Search .................... 248/97, 99, 101, 166

[56] References Cited

U.S. PATENT DOCUMENTS

| | | | |
|---|---|---|---|
| D. 216,438 | 1/1970 | Gay et al. | 248/97 X |
| 1,057,240 | 3/1913 | Hildreth . | |
| 1,278,385 | 9/1918 | Rickard | 248/101 X |
| 1,542,164 | 6/1925 | Nelson | 248/97 |
| 1,653,393 | 12/1927 | Cox . | |
| 2,010,789 | 8/1935 | Roesel . | |
| 3,410,328 | 11/1968 | Sasai . | |
| 3,905,406 | 9/1975 | Cruse . | |
| 4,157,801 | 6/1979 | Elmer | 248/97 |
| 4,273,167 | 6/1981 | Stillwell | 248/97 X |
| 4,846,427 | 7/1989 | Jones . | |
| 4,889,300 | 12/1989 | Gibson et al. | 248/97 |
| 5,016,844 | 5/1991 | Garvin | 248/97 |
| 5,058,839 | 10/1991 | Stevens | 248/97 |
| 5,060,893 | 10/1991 | Halbert | 248/97 |

Primary Examiner—David M. Purol
Attorney, Agent, or Firm—Julian C. Renfro

[57] ABSTRACT

A foldable, easily stored stand for supporting a leaf bag or the like, the stand comprising upper and lower bag retainer rings made up of tubular components. These tubular components are formed in such a manner that the bag retainer rings take on an essentially circular configuration. The bag retainer rings are interconnected at spaced apart locations by a pair of straight tubular components forming column members of equal length, with the opposite ends of one of the column members being hingedly connected to a first location on each of the bag retainer rings. The opposite ends of the other of the column members are hingedly connected to a second location on both of the bag retainer rings, with the second location on the bag retainer rings being at a substantially opposite position on the bag retainer rings with respect to the first location. The bag retainer rings are thus held in a substantially parallel, spaced apart relationship by the column members, with the hinge connection of the column members to the bag retainer rings permitting the bag retainer rings to be moved from a spaced apart, parallel relationship, to a compacted condition in which the bag retainer rings move toward and approach a coplanar relationship.

18 Claims, 2 Drawing Sheets

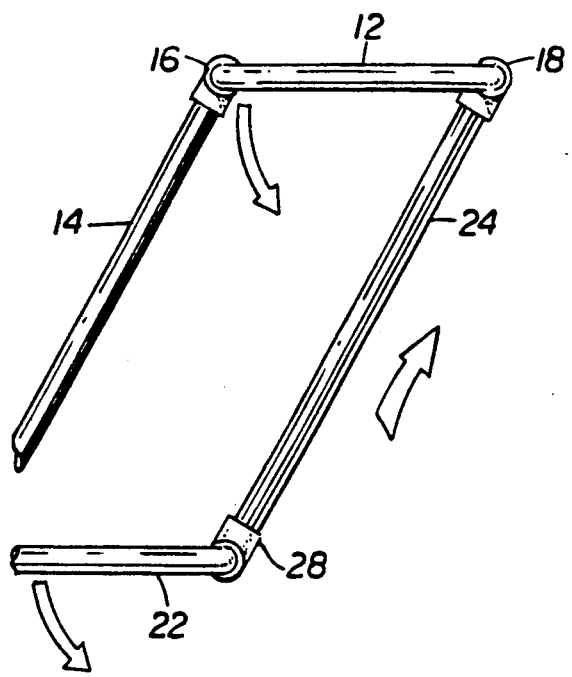
FIG 3
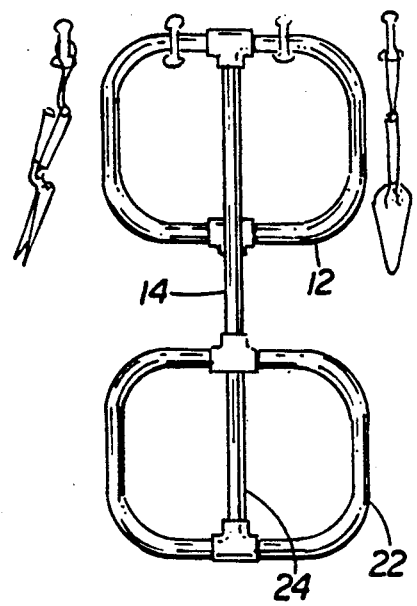
FIG 4
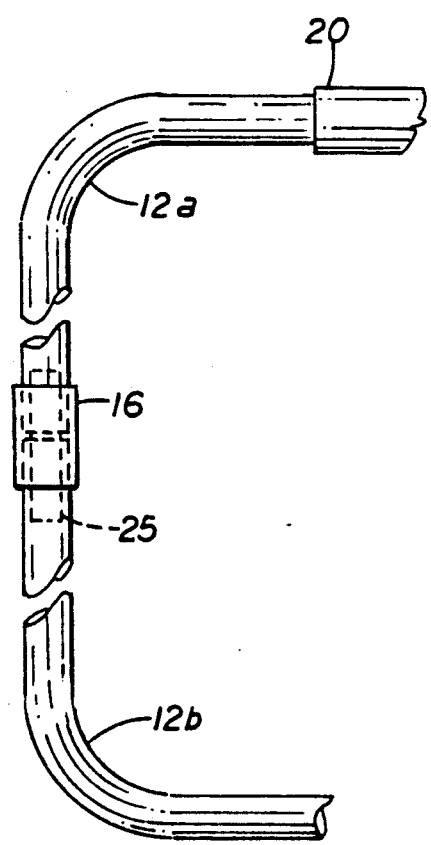
FIG 5
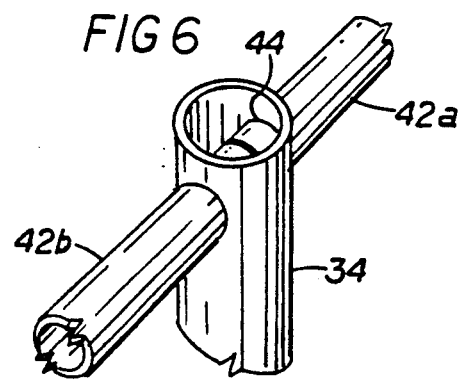
FIG 6
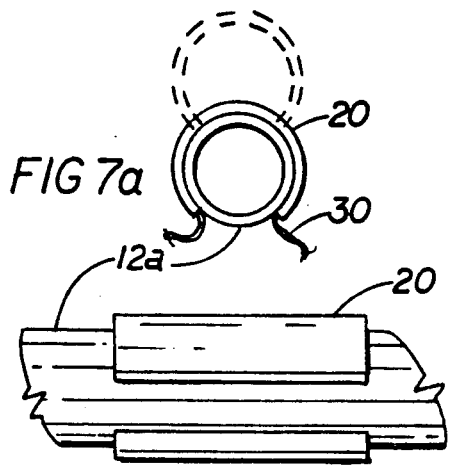
FIG 7a
FIG 7b

UNIVERSAL COLLAPSIBLE BAG SUPPORT STAND

BACKGROUND OF THE INVENTION

Composting has become a universally current necessity. Need exists for an inexpensive rigid, thin walled plastic bag stand to receive a variety of bio-degradable materials easily transportable to a composter. Further need exists that the bag stand be light, rigid, inexpensive and be easily transported over rough or smooth terrain and easily operated by young, old or handicapped persons.

It has been known for many years that receptacles in the nature of bags of cloth, paper or plastic must be supported by a stand or holder of some type if one person is to be expected to work in an effective manner as he or she goes about filling a bag of this type with goods, food items or rubbish.

An example of an early form of bag holder is the Hildreth Patent No. 1,057,240, which pertains to a simple wooden frame comprising only a bottom and left and right sides, with the left and right sides being hingedly attached to the bottom. When the sides are brought into an upright position, the upper edges of these sides can form two adjacent support locations for supporting the upper part of the bag in the filling position. After the filling procedure has been completed, the frame can then be folded into a compacted position.

Another device of this general type is the Cox Patent No. 1,653,393 entitled "Holder For Bags During Filling Operation," which issued Dec. 20, 1927. This device is made of U-shaped frame members of hollow tubular material, with suitable hinge means permitting the user to laterally move such holder for the folded condition into a deployed position in which the mouth of the bag can be supported in the open position by the upper portions of the U-shaped members. This device obviously uses the metallic tubular members, and only involves a three-sided support, rather than a continuous support for the entire circumference of the mouth of the bag.

Other patentees have provided bag holding devices suitable for use with groceries as well as waste receptacles, and the Roesel Patent No. 2,010,789 entitled "Sanitary Waste Basket and Stand" would appear to be a satisfactory device for holding a paper grocery bag in the appropriate condition for receiving groceries, but it does not provide around its upper edge, any form of continuous support arrangement that would be satisfactory for supporting the mouth of a plastic bag in a goods-receiving or trash-receiving manner.

The Sasai Patent No. 3,410,328 entitled "Delivery Continuer for Perishable Foods" was issued Nov. 12, 1968, and involves upper and lower continuous, four-sided members held together by four pairs of struts arranged in X form. The ends of the strut members are mounted in slots in a manner permitting the upper and lower continuous members to be pulled apart when the device is to be used, or pushed together at the time of storage. The Sasai configuration, however, necessarily utilizes a number of carefully formed components that could not be produced inexpensively, nor fitted together except by the employment of a sizable amount of hand labor.

The Cruse Patent No. 3,905,406 entitled "Bag Support Stand" does provide a continuous support for the mouth of a paper or plastic bag, and utilizes U-shaped leg assemblies. It is quite obvious, however, that Cruse's configuration utilizes metallic leg members and this patentee goes to the considerable trouble of making his stand adjustable, so that different sizes of flexible walled containers can be accommodated. While the Cruse stand would not likely be as costly to produce as the Sasai device, it would nevertheless involve a considerable expenditure of funds for its production, and it would not appear to be strong enough to support a heavily laden bag.

The Jones Patent No. 4,846,427 entitled "Lawn and Leaf Bag Frame" involves a wheeled device that can be utilized in a deployed condition and thereafter moved to a folded condition at the time of storage. However, this device necessitates the use of spreader means and bag retention means, and represents a device of elaborate construction obviously costing many dollars to manufacture and to assemble.

It was to overcome the disadvantages and expense of these prior art devices that the present invention was evolved, which is a particularly sturdy device able to be produced very economically.

SUMMARY OF THE INVENTION

A foldable, easily stored device for supporting a leaf bag or the like in accordance with this invention comprises upper and lower bag retainer rings or planar members made up of tubular components, such as of polyvinyl chloride (PVC). By the expression "or the like" I intend to refer to the widely available low-cost bags in which items such as leaves, dirty linen and grass cuttings ar e placed. These bags are usually of thin-walled plastic, that have been placed in folded condition and marketed in quantity, usually being packaged in cardboard containers. Both of these bag retainer rings are preferably configured to form a closed, continuous loop that may be regarded as either generally circular, or generally rectangular with smooth corners. These retainer rings are hingedly interconnected in accordance with this invention by a pair of column members of equal length, that may also be made of PVC. Because of the hinged interconnection, my stand for supporting a thin-walled bag may be readily moved into a flattened condition suitable for storage.

In accordance with the preferred embodiment of my invention, the column members have the same diameter as the bag retainer rings. In accordance with a secondary embodiment, however, the column members may be of a diameter slightly larger than the diameter of the tubular components from which the bag retainer rings or planar members are constructed, to permit the drilling of holes near the ends of each of the column members, for tightly receiving the ends of the bag retainer rings therein.

Considering my novel stand in somewhat greater detail, it is to be understood that the opposite ends of one of the column members are hingedly connected to a first location on each of the bag retainer rings or planar members, whereas the opposite ends of the other of these column members are hingedly connected to a second location on both of the bag retainer rings, such that the two column members are in an essentially parallel relationship. The second location on the bag retainer rings is at a substantially opposite position on the bag retainer rings to the first location, with the bag retainer rings thus being held in a substantially parallel, spaced apart relationship by the column members, such that the open end of a thin-walled plastic bag can be readily received on the bag retainer ring that is uppermost in a given instance.

At the time my bag support stand is to be stored, the hinged connection of the column members to the bag retainer rings or planar members advantageously permits the bag retainer rings to be moved from a spaced apart, parallel relationship, to a compacted condition in which the bag retainer rings move in a direction toward a coplanar relationship. My novel stand may thus be regarded as being configured in the manner of a parallelogram, which is a four-sided figure whose opposite sides are parallel and equal. The column members are parallel to each other when the stand has been deployed, and remain essentially parallel to each other as to the stand is moved into the collapsed or folded position. Likewise, the bag retainer rings are parallel to each other when the stand is in use, and they remain essentially parallel to each other as the stand is moved into the folded position for storage.

Because of the highly effective type of hinge joints I utilize, which possess a high degree of friction, my novel stand will advantageously remain in the position into which it has been moved, with no ties, straps or clips of any kind being necessitated.

In addition, the configuring oft he bag retainer rings to be slightly larger than the opening of a particular size of thin-walled plastic bag means that the opening of the bag must be stretched slightly in order to fit over the uppermost bag retainer ring, thus usually making unnecessary the use of any fasteners or clips for holding the plastic bag in a desirable relationship to the stand.

As will be made clear as the description proceeds, the components constituting my device can be produced at low cost, and when deployed into their operational positions, form a sturdy stand that will support the open end of a thin-walled bag of selected size in a highly effective manner, without danger of tipping over.

It is therefore a primary object of this invention to provide a lightweight, low cost stand for supporting the open end of a thin-walled bag in a stable and highly advantageous manner.

It is another object of this invention to provide a lightweight stand made of non-rusting yet sturdy and inexpensive components, that will function to support the open end of a thin-walled bag in a highly effective manner, yet being immediately foldable into minimal space when not in use.

It is still another object of this invention to provide a sturdy stand that can be made of PVC tubing, which offers the advantage of a continuous support for the entire circumference of the mouth of a thin-walled bag, yet being able to be produced very inexpensively.

It is yet still another object of my invention to provide a stand specifically tailored to receive a thin-walled plastic bag of any of several selected sizes in a highly effective relationship, with this arrangement being particularly adapted for the collection and transport of re-cyclable, bio-degradable materials suitable for composting.

It is yet still another object of my invention to provide a bag supporting stand that is readily movable between the deployed position and a folded position suitable for storage, with the hinge joints between the components constituting the stand being desirably stiff, so that the stand can be expected to remain, without slippage, in the position into which it has been moved in a given instance.

It is yet still another object of my invention to provide a stand that can be effectively operated by a person of almost any age, whether young, old or handicapped, with my novel stand being easily transportable, with wheels not being required.

It is yet still another object of my invention to provide a stand utilizing a pair of generally circular bag retainer rings that, when one of such rings is uppermost in a generally horizontal position, can effectively support the mouth of a bag, with the bag retainer ring being sized to require the open end of the bag to be stretched thereover. The use of any clips or fasteners for holding the bag in a desired open position are therefore unnecessary unless it can be anticipated that the bag will be so heavily loaded as to cause slippage.

These and other features, objects and advantages will be apparent from an inspection of the appended figures of drawing.

BRIEF DESCRIPTION OF DRAWINGS

FIG. 3 is a side elevational view revealing that my novel bag support stand is generally of a parallelogram-type configuration, which can be readily moved from a deployed position into a folded position, with the relative movement taking place at the joints located at the ends of the columnar members, where they hingedly interconnect with the upper and lower bag retainer rings;

FIG. 4 is a view illustrating how my stand, when moved into the collapsed condition, can readily be hung on a garage wall, for example;

FIG. 5 is a fragmentary view to a comparatively large scale, revealing how the two members constituting each bag retainer ring or planar member can be joined together at the location of the preferred T-joint type hinge, with the juncture of the two members thus being the location where a columnar member is attached;

FIG. 6 is a fragmentary view showing the details of an alternative type of hinge joint;

FIG. 7a is an end view revealing how an optionally used plastic clip can be employed to clamp a piece of a thin-walled bag to the bag retainer ring; and FIG. 7b is a fragmentary view, revealing other details of the clip usable to hold the bag to the retainer ring.

DETAILED DESCRIPTION

Figure 1:
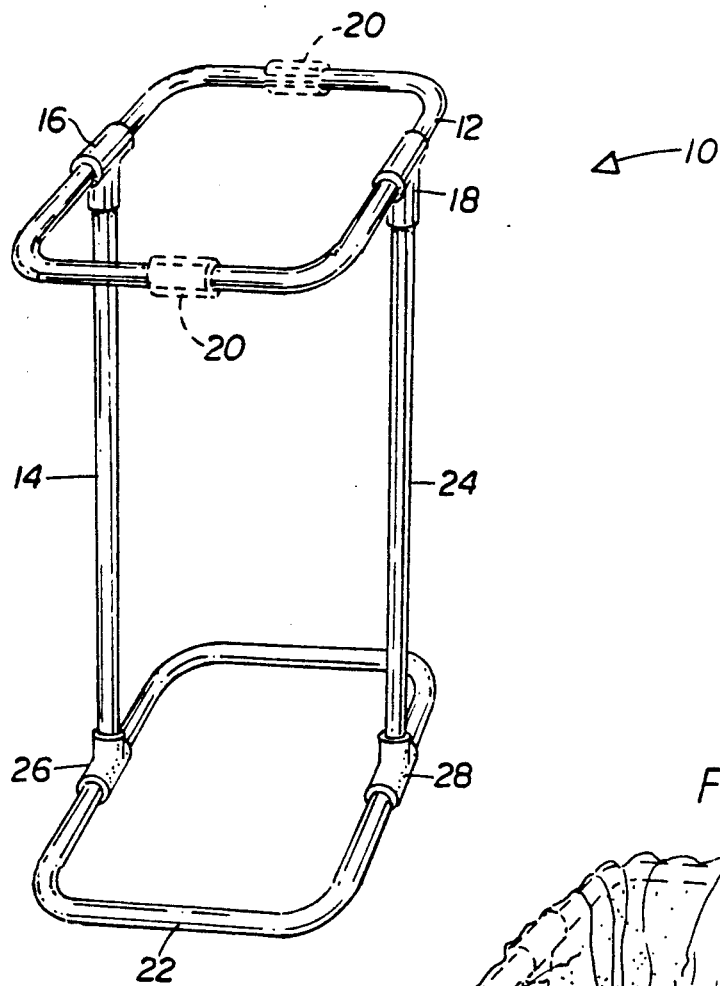
FIG. 1 is a perspective view of an exemplary version of my novel stand for supporting a thin-walled bag or the like, involving upper and lower bag retainer rings or planar members that are hingedly interconnected by the use of a pair of equal length column members.

With initial reference to FIG. 1, it will there be seen that I have shown an exemplary version of my foldable bag support stand or device 10 designed to support the mouth of a thin-walled bag in the goods-receiving or trash-receiving position.

The device 10, which may also be regarded as a collapsible bag support device or bag frame, is principally constituted by an upper bag retainer ring or planar member 12, and a lower bag retainer ring or planar member 22. These bag retainer rings are maintained in a desired, operative relationship by the use of columnar members 14 and 24 of equal length, that are hingedly connected in a tightly-fitting manner to the bag retainer rings.

Advantageously, both of the bag retainer rings or planar members may form a continuous loop or circle, and because of this, either bag retainer ring can form a highly effective means for supporting the entire circumference of the open end of a thin-walled bag or the like, while at the same time the other bag retainer ring can serve as a very stable support for the device 10.

As will be more clear as the description proceeds, the bag retainer rings 12 and 22 can be regarded as generally circular, or generally rectangular with smooth, curved corners. These bag retainer rings are preferably individualized for use with a certain size thin-walled plastic bag, with the arrangement being such that the bag retainer ring is slightly larger than the opening of the bag whose use is intended. Thus, when the bag is to be installed on the appropriate bag retainer ring, the opening of the bag must be stretched somewhat in order for it to be received over the bag retainer ring. This stretching of the opening of the bag causes the bag to cling tightly to the retainer ring, in the manner depicted in FIG. 2. Advantageously, the entire circumference of the retainer ring is completely free of any protrusions that would inhibit the stretching of the top of the bag thereover. This of course is to be contrasted with some bag retainer rings, wherein the support members for the ring are of such placement as to interfere with at least a portion of the circumference of such rings.

Although the use of any fasteners, clips or the like is therefore usually unnecessary, it is possible when it is anticipated that the bag may become heavily loaded, to utilize a pair of clips 20 on the upper bag retainer ring, as indicated in dashed lines in FIG. 1. The optionally used clips are to be seen in greater detail in FIGS. 7a and 7b.

I usually construct the bag retainer rings 12 and 22 of identical size, so that either end of the stand can be turned uppermost, but this is not a firm requirement of my invention.

Although I am not to be limited to the use of components made from polyvinyl chloride (PVC), such components possess the attributes of being of low cost and sturdy, while a the same time being impervious to moisture and rust. I have found that thin-walled plastic bag and PVC have a definite affinity for each other, with bag slippage being minimized. Other plastic tubing could offer many of these same advantages as PVC, but are not cost effective. Metal tubing cannot compete without modification, and fabrication costs makes its use prohibitive. In addition, thin-walled plastic bags more readily tend to slip with respect to metal tubing.

Although my invention is not to be limited to use with PVC tubing, for the reasons set forth above as well as for other reasons I prefer to use PVC components in the construction of my novel collapsible bag support stand. The manner in which the upper and lower planar members are preferably constructed will be discussed hereinafter.

Figure 1A:
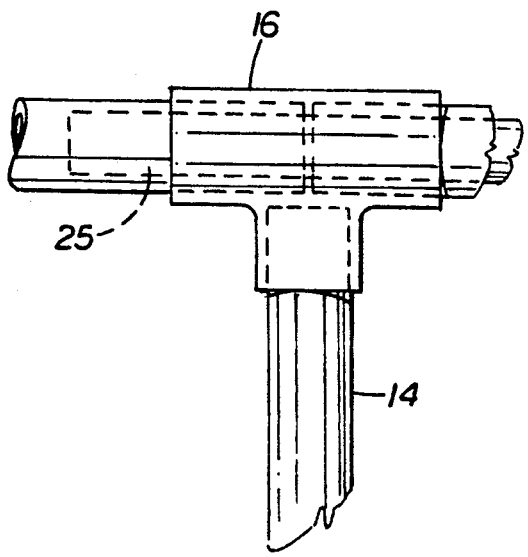
FIG. 1a is a fragmentary perspective view to a somewhat larger scale, illustrating a preferred form of a typical hinge joint utilized between components.

In the preferred embodiment of my invention depicted in FIG. 1, the bag retainer rings 12 and 22 are interconnected with the equal length column members 14 and 24 by the use of T-joints of PVC. As will be noted from their figure, the upper end of column member 14 terminates in a T-joint 16, whereas the lower end of column member 14 terminates in a T-joint 26. Similarly, the upper end of column member 24 terminates in a T-joint 18, whereas the lower end of column member 24 terminates in a T-joint 28. PVC cement is typically placed upon the end of each column member, to secure the respective T-joint thereto. As is obvious, the aligned openings of the upper T-joint must be in a parallel relation with the aligned openings of the lower T-joint at the time the part of each T-joint perpendicular to the aligned openings is being cemented to the end of the respective column member. The specific construction I prefer to use is depicted in FIG. 1a, where T-joint 16 is shown to a larger scale. This construction will alter be discussed in some detail.

It is to be understood that the hinged connections utilized where the column members intersect the bag retainer rings are comparatively stiff, as a consequence of the ends of the members constituting the bag retainer rings fitting very closely inside the aligned openings of each T member of PVC.

As a result of the construction I utilize, my novel stand or support device can readily be folded into a compacted position for storage, and because of the comparatively stiff joints formed where the column members connect to the bag retainer rings, my novel stand can be expected to remain in the condition in which it is placed, whether in the operational mode shown in FIG. 1, or in the compacted mode utilized for storage, which is illustrated in FIG. 4.

Figure 2:
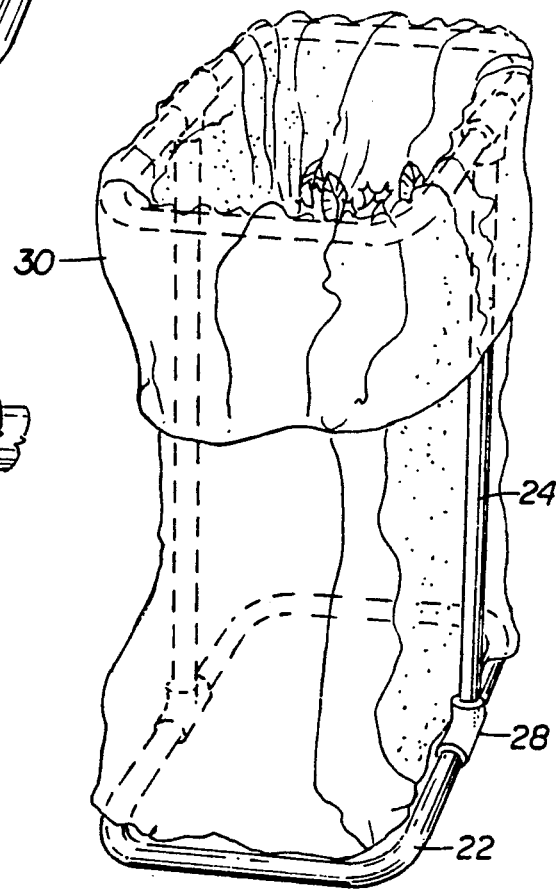
FIG. 2 is a view substantially identical to FIG. 1, but illustrating my device utilized in conjunction with a thin-walled plastic bag, which is being used in this instance to receive leaves, but which could be used for support of re-cycling bio-degradable materials suitable for composting, as well as for a wide range of other uses.

Turning to FIG. 2, it will there be seen that I have shown my stand in approximately the same position as depicted in FIG. 1, but in this instance serving as a support means for thin-walled bag 30, such as of plastic. Such plastic bags are currently marketed by many companies, and frequently are called lawn and garden bags, or the like. These plastic bags come in many sizes, such as 30 gallon, 39 gallon, 45 gallon, and the like. It will be noted in FIG. 2 that the bag is being used to receive leaves, although many other uses are obvious, with the collection of soiled linens or trash being but two of these other uses.

It is important to realize that because of its circumference, the upper bag retainer ring or planar member 12 serves to support the entire circumference of the bag 30 in a very adequate manner, by virtue of the opening of the bag being stretched over the upper bag retainer ring. Ordinarily, no other means are required for holding the bag in the correct position, so that any tearing of the bag is unlikely. If, however, the user takes the step of inserting branches or the like into the bag, it is obvious that the sharp, broken end of a branch will readily tear the sidewall of a thin plastic bag. Clips 20 can of course be used when the bag is to be loaded in a particularly heavy manner, as mentioned before.

With reference now to FIG. 3, it is to be noted that the utilization of the hinge joints of the type-illustrated in FIG. 1a at the locations where the upper ends of the columnar members 14 and 24 join the upper bag retainer ring, and the utilization of similar hinged joints where the lower ends of the columnar members join the lower bag retainer ring, makes it a relatively simple matter for the user to fold the components constituting my device into the compacted condition enabling it to be stored flat. As previously mentioned, my novel collapsible bag support stand can be regarded as being of parallelogram-type construction inasmuch as the columnar members 14 and 24 have the same dimensions and are normally parallel to each other, and the two bag retainer rings are usually the same size, and are normally parallel to each other.

As also previously mentioned, the joints where the columnar members meet the bag retainer rings are deliberately stiff, meaning that the user must make a very definite effort to move the stand from the upright, deployed position, into the folded condition. The opposite is also true, for the reason that it is desired for the stand to remain in the folded condition until it is ready to be used, with the use of any ties or clips or the like to hold the stand in the folded condition being totally unnecessary.

FIG. 4 illustrates how after being moved into the compacted condition, my stand can readily be stored on two hooks on the wall of a garage, for example. Many other storage arrangements are of course possible.

Turning now to FIG. 5, it will be seen that I have there revealed how the pair of tubular components constituting a bag retainer ring can be joined together, preferably at the location where the bag retainer ring is connected to the column member, although the bag retainer rings or planar members 12 and 22 could be of one-piece construction, I have found it particularly advantageous to make each bag retainer ring of generally semi-circular configuration, with the two halves joined together at the time the bag retainer rings of the stand or storage device are being assembled in a desired relationship to the column members.

To make the point amply clear, it will be noted in FIG. 5 that I have called out two separate members 12a and 12b, as representing the components that are joined together to form the bag retainer ring 12. This is preferably accomplished by joining the adjacent ends of the semi-circular members into a unitary planar device 12 or 22 by inserting a length of a somewhat smaller diameter component inside the two adjacent ends; note the component 25 represented by dashed lines in FIGS. 1a and 5. The assemblage of the semi-circular members into the configuration I am calling the bag retainer ring or planar member can be made permanent by utilizing the well-known PVC cement commonly used when joining PVC pipe components together. As is obvious, no PVC cement must be permitted to contact the ends of the members 12a and 12b, or the interior of the aligned openings in the T-joint. The consequence of this would of course be highly undesirable, for it would render the hinge joint non-operational.

It is important to note that I typically do not join the abutting ends of the two generally semi-circular members together to form the bag retainer ring until such time as the aligned openings of the T-fitting at one end of a column member, such as column member 14, are clean and ready to receive the ends of the semi-circular members.

It is readily possible for the bag support stand constructed in accordance with FIGS. 1a and 5 to have semi-circular components held together in a highly satisfactory manner, and to have a selected amount of joint friction. Undesired separation of the joints is prevented by cutting a component 25 from schedule 160 PVC pipe ½ inch in diameter, with the component being, for example, 1½ inches long. The dowel so created is then slotted longitudinally, and one end of the dowel is then inserted into one end of one end of the bag retainer halves of semi-circular configuration. That end and the protruding dowel are then inserted into one of the aligned openings of the T-joint. The T-joint is preferably made up of schedule 40 PVC.

The opening at one of the ends of the other bag retainer half is then inserted over the opposite end of the dowel, thus to create a connection of the type shown in FIGS. 1a and 5. The assemblage is made permanent by placing PVC cement on the dowel. No cement is used in the aligned openings of the T-joints, however. I have found that the type of joint illustrated in these two figures has a very desirable amount of friction, such that the stand will remain in whatever position in which it is placed.

With regard to the secondary type of hinge illustrated in FIG. 6, it has already been mentioned that I can provide a hole of a carefully established size in each end of the column members, so that the abutting ends of the two generally semi-circular members will fit very tightly into such hole at such time as joinder is being effected. In the embodiment represented by FIG. 6, I drill or otherwise form a hole 44 in the upper end of column member 34, which hole is slightly smaller than the diameter of the tubing from which the semi-circular members 42a and 42b are fabricated, a desirably stiff hinge joint can be created. In this secondary embodiment, it is obvious that each of the column members must have a somewhat larger diameter than do the components constituting the semi-circular members. Because of the tight fit I am able to achieve, my novel bag support stand can be expected to remain either in the fully deployed position or in the folded position until such time as the user makes a deliberate effort to move the stand from one condition into the other.

With reference now to FIGS. 7a and 7b, it is to be realized that these pertain to the use of a tightly fitting clip 20 to hold the bag 30 firmly in a non-slip manner with respect to the component 12a of the upper bag retainer ring 12. In the preferred embodiment of clip, the clip is of resilient material, made for example of a short section of PVC tubing that has been cut into a U-shaped configuration. FIG. 7b shows a typical length of a clip.

The inside diameter of the clip 20 essentially matches the outside diameter of the components of which the planar member is constructed, so that when an upper portion of the plastic bag 30 has been laid over the tubing of which the upper bag retainer ring or planar member is constructed, the clip can be snapped tightly in place. In FIG. 7a, the non-installed position of the clip is shown in dashed lines, whereas the installed position of clip 20 is shown in full lines in this figure. The installation of the clip in the position shown i full lines in FIG. 7a results in the bag 30 being held tightly in a non-slip relationship to the upper bag retainer ring.

It should now be obvious that my invention can be implemented in many different ways, and I am not to be limited to any particular constructional materials, nor to any specific dimensions. One particularly satisfactory configuration, however, involved the use of columnar members some 31¼ inches high, constructed of PVC tubing one inch in diameter. The center-to-center distance between the columnar members was 17 inches.

it is to be understood that I can utilize either of the two above-described ways of creating the hinges responsible for my collapsible bag support stand maintaining the configuration in which it is placed by the user, although other hinge joints in the spirit of this invention are possible.

With regard to the embodiment depicted in FIGS. 1, 1a and 5, typical dimensions of the components utilized may for example be as follows:

EXAMPLE 1

| | |
|---|---|
| Length of column members 14 and 24 | 31¼ inches |
| Diameter of tubing used | ¾ inches |
| Length of sub-bag retainer ring 12a & 12b | 33¾ inches |
| Radii of formed 12a & 12b | 11 inches |
| Diameter of tubing used | ¾ inches |
| Circumference of sub-bag retainer rings 12a & 12b utilized to form completed bag retainer rings 12 (& 22) | 67½ inches |
| Size of plastic bag | 30, 39, 45 gallons |

With regard to the embodiment depicted in FIG. 6, the components I utilize may for example have the following dimensions:

| | |
|---|---|
| Length of column members 14 and 24 | 31¼ inches |
| Diameter of tubing used | 1 inches |
| Length of sub-bag retainer ring 12a & 12b | 33¾ inches |
| Radii of formed 12a & 12b | 11 inches |
| Diameter of tubing used for 12a & 12b | ¾ inches |
| Circumference of sub-bag retainer rings 12a & 12b utilized to form completed bag retainer rings 12 (& 22) | 67½ inches |
| Diameter of tubing used | 1 inches |
| Size of plastic bag | 30, 39, 45 gallons |

A number of advantages are obtained by the use of the construction depicted in the first five figures of drawings, and described in Example 1, which advantages are as follows:

1. Lighter
2. Tighter hinge
3. Constructional details covered by use of "tee" hinge
4. Easier to slide bag support stand over ground
5. Lower bag retainer ring conforms more closely to the ground
6. Use of alignment tool eliminated
7. Faster assembly
8. Less expensive
9. More professional appearance It is thus to be seen that I have provided a highly effective bag support stand utilizing materials of a very inexpensive nature, whose structural members are arrayed generally in the configuration of a parallelogram. At the time of my bag support device is to be stored, the hinged connection of the column members to the bag retainer rings or planar members advantageously permits the bag retainer rings to be moved from a spaced apart, parallel relationship, to a compacted condition in which the bag retainer rings move in a direction toward a coplanar relationship. The column members are parallel to each other when the stand has been deployed, and remain essentially parallel to each other as to the stand is moved into the collapsed or folded position.

I am obviously not to be restricted to using the particular materials mentioned, nor to the dimensions suggested in the embodiments described herein, for I am only to be limited by the scope of the appended claims.

I claim:

1. A foldable, easily stored stand for supporting a thin-walled bag or the like, said stand comprising upper and lower planar members made up of tubular components, said planar members being of substantially equal size and interconnected by a pair of column members, the opposite ends of one of said column members being hingedly connected to a first location on each of said planar members, and the opposite ends of the other of said column members being hingedly connected to a second location on both of said planar members, with said second location on said planar members being at a substantially opposite position on said planar members to said first location, with said planar members thus being held in a substantially parallel, spaced apart relationship by said column members, the substantially equal size of said planar members enabling a user to install a thin-walled bag on either of said planar members that has been placed in an upright position, said hinge connection of said column members to said planar members permitting said planar members to be moved from a spaced apart, parallel relationship, to a compacted condition in which said planar members move toward and approach a coplanar relationship.

2. The foldable, easily stored stand for supporting a thin-walled bag or the like as recited in claim 1 in which said hinge connections are T-shaped members of PVC.

3. The foldable, easily stored stand for supporting a thin-walled bag or the like as recited in claim 1 in which said planar members are made of PVC tubing, and said column members are also made of PVC tubing, but of slightly larger diameter than that of the planar members.

4. The foldable, easily stored stand for supporting a thin-walled bag or the like as recited in claim 3 in which each end of each of said column members contains a hole, into which hole a component of the respective planar member closely resides, thus forming said hinge connection.

5. The foldable, easily stored stand for supporting a thin-walled bag or the like as recited in claim 1 in which each of said planar members is generally circular, and made up of a pair of generally semi-circular members, joined together at the locations where the hinge connection with the respective column member is to be made.

6. The foldable, easily stored stand for supporting a thin-walled bag or the like as recited in claim 5 in which each of said planar members has a pre-established circumference, which circumference is slightly larger than the size of the opening of a bag that may be used therewith.

7. A foldable, easily stored stand for supporting a leaf bag or the like, said stand comprising upper and lower bag retainer rings made up of tubular components, said tubular components being formed into an essentially circular configuration, with said bag retainer rings being of substantially equal size and interconnected at spaced apart locations by a pair of straight tubular components forming column members of equal length, the opposite ends of one of said column members being hingedly connected to a first location on each of said bag retainer rings, and the opposite ends of the other of said column members being hingedly connected to a second location on both of said bag retainer rings, with said second location on said bag retainer rings being at a substantially opposite position on said bag retainer rings with respect to said first location, with said bag retainer rings thus being held in a substantially parallel, spaced apart relationship by said column members, the substantially equal size of said retainer rings enabling a leaf bag to be installed on either retainer ring that has been placed in an upright position, said hinge connection of said column members to said bag retainer rings permitting said bag retainer rings to be moved from a spaced apart, parallel relationship, to a compacted condition in which said bag retainer rings move toward and approach a coplanar relationship.

8. The foldable, easily stored stand for supporting a thin-walled bag or the like as recited in claim 7 in which said hinge connections are T-shaped members of PVC.

9. The foldable, easily stored stand for supporting a thin-walled bag or the like as recited in claim 7 in which said bag retainer rings are made of PVC tubing, and said column members are also made of PVC tubing, but of slightly larger diameter than that of the bag retainer rings.

10. The foldable, easily stored stand for supporting a thin-walled bag or the like as recited in claim 9 in which each end of each of said column members contains a hole, and into each hole a component of the respective bag retainer ring closely resides, thus forming said hinge connection.

11. The foldable, easily stored stand for supporting a thin-walled bag or the like as recited in claim 7 in which each of said bag retainer rings is made up of a pair of generally semi-circular members, joined together at the locations where the hinge connection with the respective column member is to be made.

12. The foldable, easily stored stand for supporting a thin-walled bag or the like as recited in claim 11 in which each of said bag retainer rings has a pre-established circumference, which circumference is slightly larger than the size of the opening of a bag that may be used therewith.

13. A foldable, easily stored stand for supporting a leaf bag or the like, said stand comprising upper and lower planar members made up of tubular components, said tubular components being formed into an essentially circular configuration, each of said planar members being of essentially equal size and hingedly connected by a pair of straight tubular components forming parallel column members of equal length, hinge components formed at essentially opposite locations on each of said planar members, one end of each of said column members being connected to respective hinge components on one of said planar members, and the opposite end of each of said column members being connected to respective hinge components on the other of said planar members, with said planar members thus being held in a substantially parallel, spaced apart relationship by said column members, the essentially equal size of said planar members enabling a leaf bag to be received on either planar member that has been placed in an upright position, said hinge connections of said column members to said planar members permitting said planar members to be moved from a spaced apart, parallel relationship, to a compacted condition in which said planar members move toward and approach a coplanar relationship.

14. The foldable, easily stored stand for supporting a leaf bag or the like as recited in claim 13 in which said hinge components are T-members of PVC.

15. The foldable, easily stored stand for supporting a leaf bag or the like as recited in claim 13 in which said planar members are made of PVC tubing, and said column members are also made of PVC tubing, but of slightly larger diameter than that of the planar members.

16. The foldable, easily stored stand for supporting a leaf bag or the like as recited in claim 15 in which each end of each of said column members contains a hole, into which hole a component of the respective planar member closely resides, thus forming said hinge components.

17. The foldable, easily stored stand for supporting a leaf bag or the like as recited in claim 13 in which each of said planar members is made up of a pair of generally semi-circular members, joined together at the locations where the hinge connection with the respective column member is to be made.

18. The foldable, easily stored stand for supporting a leaf bag or the like as recited in claim 17 in which each of said planar members has a pre-established circumference, which circumference is slightly larger than the size of the opening of a bag that may be used therewith.

* * * * *